United States Patent [19]

Liu et al.

[11] Patent Number: 5,526,684

[45] Date of Patent: Jun. 18, 1996

[54] METHOD AND APPARATUS FOR MEASURING MULTIPHASE FLOWS

[75] Inventors: K. T. Liu, Cerritos; William Rieken, Bakersfield; J. P. Anduiza, Huntington Beach; G. E. Kouba, Placentia, all of Calif.

[73] Assignee: Chevron Research and Technology Company, a Division of Chevron U.S.A. Inc., San Francisco, Calif.

[21] Appl. No.: 179,218

[22] Filed: Jan. 10, 1994

Related U.S. Application Data

[63] Continuation-in-part of Ser. No. 926,603, Aug. 5, 1992, abandoned.

[51] Int. Cl.$^6$ ........................................... G01F 15/08
[52] U.S. Cl. .............................. 73/200; 96/216; 95/261; 73/861.04
[58] Field of Search ........................... 73/200, 861.37, 73/861.38, 861.04; 55/345; 96/208, 209, 216; 95/261

[56] References Cited

U.S. PATENT DOCUMENTS 4,053,291  10/1977  Sims ........................... 96/209
4,760,742  8/1988  Hatton ........................... 73/861.04
4,860,591  8/1989  Garland ........................... 73/200

Primary Examiner—Hezron E. Williams
Assistant Examiner—Harshad Patel
Attorney, Agent, or Firm—M. W. Carson

[57] ABSTRACT

A self-regulating apparatus and method for measuring the components of a multiphase petroleum stream includes initially stratifying an incoming petroleum stream into substantially liquid and gas streams. The initial fluid stratification allows a flow-splitting separation to occur as the streams first enter a vertical separation tube. By positioning the inflow line eccentric to the vertical separation tube, a liquid vortex is created by the incoming liquid component to further enhance the liquid/gas separation. The liquid component is then drawn off by a liquid flow line also eccentrically positioned on the vertical separator, thereby minimizing the energy dissipation of the liquid vortex. Both the gas and liquid components can then be individually measured before being recombined at a common outflow port for discharge.

9 Claims, 3 Drawing Sheets

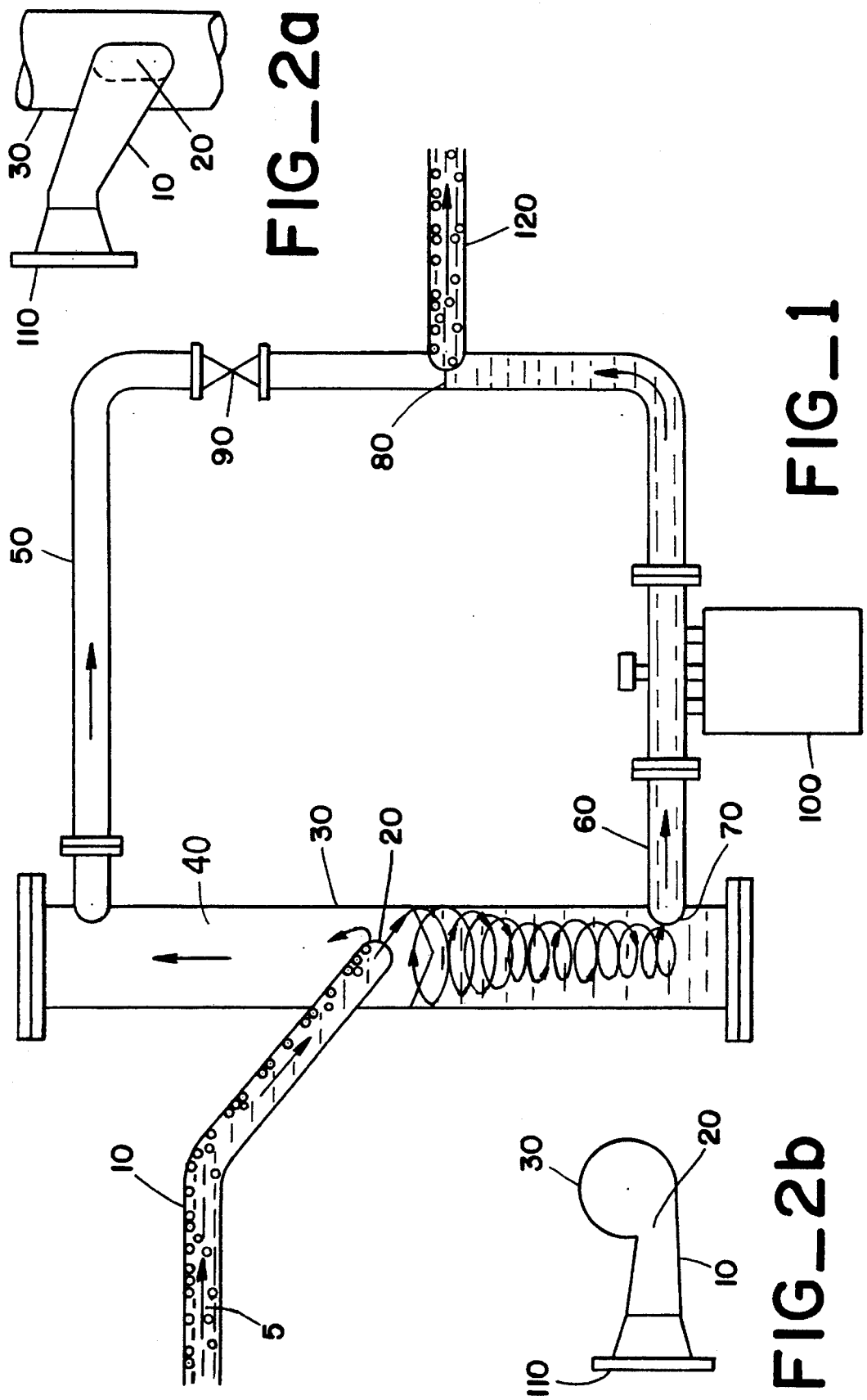

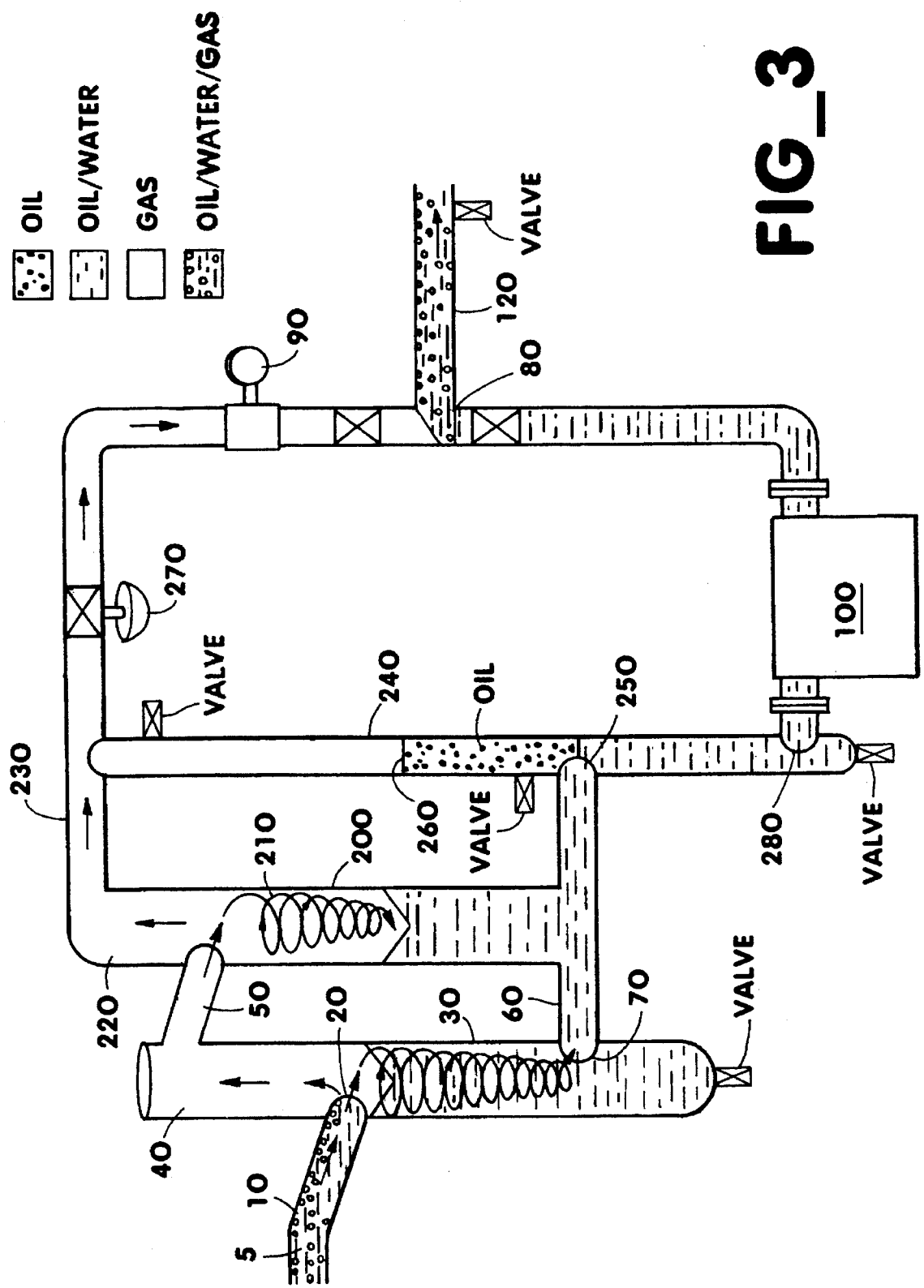
FIG_3

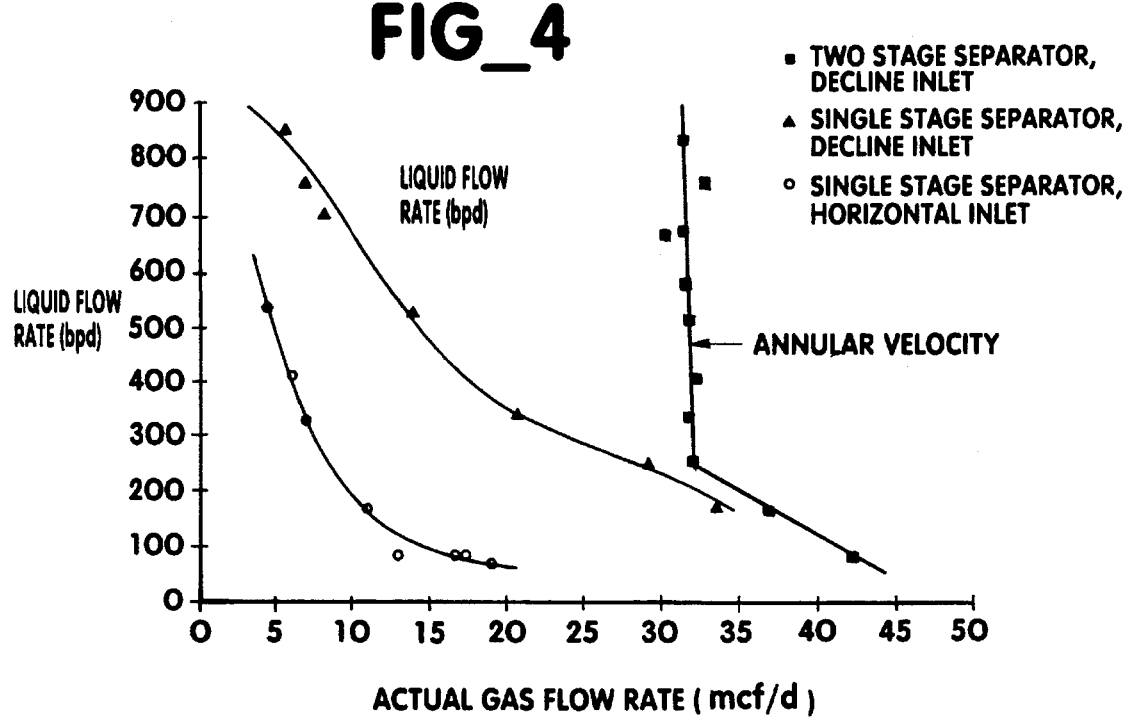
FIG_4
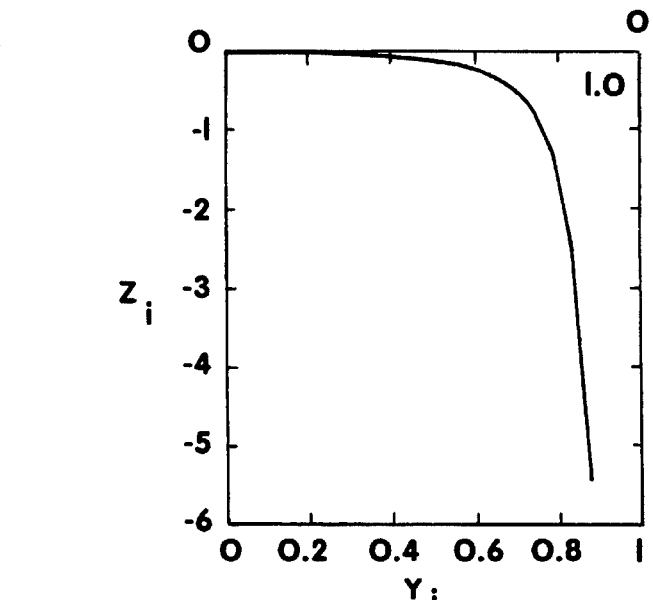
FIG_5

METHOD AND APPARATUS FOR MEASURING MULTIPHASE FLOWS

This application is a continuation-in-part of U.S. Ser. No. 926,603, filed Aug. 5, 1992, now abandoned.

FIELD OF THE INVENTION

The present invention relates to monitoring systems and methods in general for measuring flow rates of fluids, and more particularly to monitoring systems for multiphase petroleum streams. The invention is more specifically directed to a method and apparatus for measuring the quantities of gas and liquid delivered in a gas-liquid mixture as it is transported within a duct without an interruption of flow. The invention is particularly well suited for the operational control of oil wells under gas extraction and those which produce a mixture of gas and oil.

BACKGROUND OF THE INVENTION

The methods and devices presently utilized for measuring flow rates of components of a fluid stream are generally very complex and yield unreliable results. Some of these systems involve the measurement of two different physical parameters, such as velocity of sound and gamma radiation, while others utilize a more mechanical approach through the use of variable pitch blades which automatically adjust as a function of the fluid density being transferred.

Various equipment units are also in use which are directed toward stratifying the petroleum stream by having it flow at a predetermined angle to the horizontal, such as the device disclosed in U.S. Pat. No. 4,760,742. In this separation and measurement system the stratified stream flows into a gas trap from which the liquid exits by means of a liquid exit pipe. Gas and liquid flow rates are then individually measured by metering devices located downstream from each respective fluid stream. Other separation systems, like that disclosed in U.S. Pat. No. 4,860,591, depend solely on a gravity separation process by subjecting the gas-liquid mixture to a vortical flow motion within an enclosure. Such systems utilize an incoming flow which is internally tangent to the vortex enclosure while exit flow is radial through a porous wall, thereby causing a redirection of the flow and a diminishing of the vortex energy, and further requiring a percolation of the gas component through the liquid as a separation process.

SUMMARY OF THE INVENTION

The present invention is directed to a system for continuously and respectively measuring the quantities of gas and liquid in a multiphase petroleum stream by utilizing a two-dimensional convergent nozzle for acceleration of the incoming stream, and use of a tangential entry and exit of the fluid with respect to a vertical separation tube. The entry flow is preferably inclined slightly downward to promote stratification of the gas component prior to the inflow stream reaching the inlet port of the vertical separation tube. This is particularly effective at high flow rates for enhancing the resulting liquid vortex through the creation of an accelerated downward spiral of liquid along the separator wall. The downward liquid spiral prevents the circulating liquid from passing in front of the entry port on subsequent spirals and thereby disrupting the vortex energy. The vortex energy thus generated is further maintained by utilizing a tangential exit port to draw the spiralling fluid from along the separator wall without inducing any radial backflow. As a result, the gas not initially separated from the liquid as a result of flow spitting at the inlet port is buoyed through the liquid as a result of the vortex enhanced coalescence of the gas. The invention therefore utilizes two mechanisms for gas-liquid separation, an initial flow splitting, followed by a vortex enhanced separation mechanism.

The separate fluid flows are next individually measured and then recombined at a common outflow point, thereby giving the system the added benefit of being essentially self-regulating. This ability is primarily the result of the fact that as the gas/liquid ratio of the two streams increases or decreases, the two streams will continue to converge at the common outflow point.

It is therefore an object of the present invention to provide a system and method for monitoring both the gas and liquid flow rates in a multiphase petroleum stream by using both initial segregation and flow splitting, in combination with an increased gas buoyancy through vortex enhanced coalescence of the gas component as two distinct separation mechanisms.

DESCRIPTION OF THE DRAWINGS

FIG. 1 depicts the metering loop of the present invention.

FIG. 2a depicts the inlet port of the metering loop operably connected to the vertical separator.

FIG. 2b depicts a plan view of the inlet port.

FIG. 3 depicts an alternative embodiment of the metering loop of the present invention.

FIG. 4 is a graph that illustrates the separator efficiency for steady and unsteady fluid flows.

FIG. 5 is a graph that illustrates the vertical displacement from the inlet and the radial displacement from the separator wall, of the bubble trajectory.

DETAILED DESCRIPTION OF THE INVENTION

The apparatus and method in accordance with the present invention is apparent from the embodiment illustrated in FIG. 1, performing an efficient fluid phase separation as well as separate phase measurement of a crude oil production stream, which not only includes crude oil but also water and gas. The crude oil production stream 5 flows through inlet line 10 arranged at a suitable decline of about 20° to 30° to horizontal, preferably about 27° to horizontal, to cause the production stream to initially stratify into separated liquid and gas components prior to reaching inlet port 20 of vertical separator tube 30. The vertical separator tube 30 is sized in diameter such that liquid fluid level within the separator is maintained well below the inlet port 20, ensuring that the maximum gas velocity $V_{sg}$ in the gas recovery portion 40 of the separator above inlet port 20 is less than the velocity needed to achieve churn flow, which is generally about 10 ft/sec.

Single phase gas line 50 is connected to the upper portion of the gas recovery portion 40 of the vertical separator, while the liquid phase line 60 is located at the lower most portion of the separator at separator exit port 70. Both the single phase gas and liquid lines are sized such that a pressure loss in the liquid component between exit port 70 and gas-liquid recombination point 80 is less than 6 inches of liquid head pressure in separator tube 30. This requires that at the highest operational gas and liquid flow rates in lines 50 and 60 respectively, the liquid level in separator tube 30 will not deviate more than 6 inches. Operably connected to gas line 50 is gas flow meter 90, while coriolis flow meter 100 is operably interposed in liquid line 60 to measure the water and oil components of the liquid stream. A slight modification can be made to compensate for unanticipated liquid friction losses to utilize the present device in flow streams of varying viscosity having little or no gas. This modification would comprise an increase in the vertical separation of inlet 20 and outlet 80, where the outlet would be positioned low enough to provide a liquid head sufficient to exceed the liquid friction loss $f_2$.

In operation the multiphase production stream enters inlet line 10 and is initially stratified into liquid and gas phase components as a result of the declination angle of the inflow line. The inflow line is mounted eccentrically to vertical separator 30 having a two-dimensional convergent nozzle 110 at inlet port 20, as shown in FIGS. 2a and 2b, to accelerate the fluid as it enters vertical separator tube 30. Upon entering separator tube 30 the stratified fluid undergoes a flow-splitting separation, where the disassociated gas component rises into the recovery section 40 as the liquid component, having been accelerated in a downward direction as a result of nozzle 110, tangentially enters vertical separator 30 as an accelerated downwardly spiralling ribbon of fluid along the separator wall, thereby creating an efficient vortex enhanced separation mechanism for any gas component remaining in the liquid stream. Because of the downward spiral of the liquid flow along the separator wall, the liquid does not pass in front of inlet port 20 on subsequent spirals, resulting in the bulk of gas remaining in the liquid stream to pass into and up the separator as a result of the centrifugal force generated by the vortex, unobstructed by the incoming multiphase fluid stream. The liquid stream continues to downwardly spiral against the separator wall about 2 to 6 inches below inlet port 20, where the stream then centrally converges to an enhanced vortex flow until encountering the tangential exit port 70, where the liquid flow is directed through to liquid line 60. It is to be noted that the tangential exit port allows the present invention to maintain the vortex energy of the fluid stream by allowing the flow to exit the separator without any redirection of the stream.

The liquid phase, having both water and crude oil components, passes through liquid line 60 into the coriolis flow meter 100 for measurement of the individual liquid components, before it enters the fluid recombination point 80. Likewise, the gas phase, having risen to the recovery portion 40 of the vertical separatory, passes through gas line 50 and gas flow meter 90, before entering the recombination point. Those skilled in the art will recognize that the invention's use of a vertical tube as a separation column, coupled with liquid and gas flow lines which ultimately recombine at the outflow point, allow the apparatus to be essentially self regulating. As the gas/liquid ratio increases or decreases, the pressure change in one flow line will be countered by an equal pressure change in the other flow line, so as to allow the gas and liquid phases to continue to mix at the recombination point. This is evident from the fact that the pressure drop, being dependant on flow rate, can be expressed as follows:

$$\Delta P = f_1(q_g^2) = f_2(q_l^2) \rho g h$$

where the pressure drop through the gas line is expressed as function $f_1$ of the flow rate of the gas $q_g$; and the pressure drop through the liquid line is expressed as function $f_2$ of the liquid flow rate $q_l$ minus the static head of the liquid column, $\rho g h$, formed by the spiralling ribbon of fluid below inlet port 30. It is to be noted that $f_1$ and $f_2$ take into account the line diameters, line roughness, fluid flow characteristics, fitting losses and other classical fluid pressure change mechanisms well known to those skilled in the art.

It can be seen from the above equation that where the gas flow rate $q_g$ remains constant, the pressure drop in the gas line will increase while the height of the liquid column h decreases. One skilled in the art will recognize that the dependant relationship which exists between pressure change and flow rate will influence the positioning of inlet line 10 and multiphase outflow line 120, based upon the pressure drops experienced in both the gas line 50 and liquid line 60 due to their respective metering devices.

Proper sizing of the vertical separator and positioning of the inlet slot is important in order to avoid gas carry-under in the liquid leg of the metering apparatus, in addition to controlling the fluid inlet velocity through proper dimensioning of the slot. Prediction of bubble trajectory gives an approximate indication of the ability of the invention's generated vortex to separate and trap bubbles in the gas core, providing a sizing criteria for the separator. The trajectory is approximated by superimposing a cartesian coordinate system on the vertical separator tube, with the y axis parallel to the axis of the tube, and letting the variable "z" represent the vertical distance below the inlet, with the x axis variable "y" representing the radial distance from the separator wall. The trajectory can then be determined by the following integration:

$$Z(r) := \int_0^r \frac{Vez}{Vr(r)} \, dr$$

where, Vez is the bubble velocity along the axis of the cylindrical cyclone, being a function of the liquid flow q1 and the cross sectional area of the gas/liquid cylindrical cyclone, Ale, occupied by the liquid.

$$Vez := \frac{q1}{Ale}$$

The radial velocity of the bubble relative to the liquid is determined from a force balance on the bubble in the radial direction.

$$Vr(r) := \sqrt{\frac{4}{3} \cdot \frac{\rho m(r) - \rho g}{\rho 1} \cdot \frac{Vt(r)^2}{Re} \cdot \frac{Dp}{Cdr(r)}}$$

with Dp representing the particle diameter, where the tangential radial velocity profile Vt(r), is approximated by:

$$Vt(r) := VT \cdot \left(\frac{r}{Re}\right)^n$$

VT is the liquid velocity at the tangential inlet to the cyclone utilizing a liquid holdup factor of about ½. The local radial drag coefficient, Cdr(r), is calculated as follows:

$$Cdr(r) := \frac{24 \cdot (1 + 0.173 \cdot NRe(r)^{0.657})}{NRe(r)} + \frac{0.413}{1 + 16300 \cdot NRe(r)^{(-1.09)}}$$

and local radial Reynolds number is:

$$Nre(r) := \frac{\rho m(r) \cdot Vr(r) \cdot Dp \cdot 1488}{\mu}$$

With μ representing viscosity in centipoise.

A test case, utilizing the above relations was used to plot the two-dimensional tracing shown in FIG. 5, where the vertical displacement from the inlet, Z, is shown on the ordinate and the radial displacement from the separator wall, y, is shown on the abscissa. As shown in the figure, for this particular case the gas bubble is trapped at approximately y=0.75 where the downward liquid velocity has reduced to zero. The gas core is shown to begin at about y=0.83.

In calculating the overall vertical dimensions of the separator column, the determination of the liquid column height within the separator and therefore the gas/liquid interface position which is preferably just below the inlet where most efficient gas/liquid separation occurs, is performed by a simplified mechanical energy balance as follows:

$$L1 := \frac{(P1-P2) - \left[ \frac{8 \cdot \rho l \cdot q l^2}{\pi^2 \cdot gc} \cdot \left( \frac{f \cdot L3}{Dl^5} + \frac{f \cdot L2}{Dl^5} + \frac{K3}{Dl^4} + \frac{K2}{Dl^4} + \frac{K1}{Dl^4} \right) + \rho l \cdot L3 \right]}{\frac{8 \cdot \rho l \cdot q l^2}{\pi^2 \cdot gc} \cdot \frac{f}{De^5} - \rho l}$$

Here P1 and P2 refer to the pressures immediately above the gas/liquid interface in the cyclone, and in the exit junction respectively, with De referring to the internal diameter of the gas eliminator. The Moody friction factor, f, is calculated in the normal way, with q1 again representing the liquid flow rate. The variables L and K are lengths and flow resistances, respectively, for three sections of the liquid flow path: 1)cyclone, 2)horizontal liquid leg, 3)vertical riser to gas/liquid junction.

Likewise, in determining the internal diameter of the separator column the upward gas velocity within the column must be kept well below the onset of annular mist flow, marked by the gas velocity at which the smallest expected liquid droplets are suspended in the flowing gas stream. Complete transition is achieved when the gas velocity is high enough to suspend the largest droplets within the stream. This transition velocity can be determined from an axial force balance on the droplets as follows:

$$Vann := 0.6809 \cdot \left( \sigma l \cdot Nwe \cdot \frac{\rho l - \rho g}{\rho g^2} \right)^{.25}$$

where, Nwe is the Weber number. The critical value of Nwe for the largest droplets has been determined by several investigators to be approximately 30, with a Weber number of 7 seeming to work well to predict the onset of annular mist for the system.

One advantage of the present invention, in addition to being essentially self regulating, is that it is relatively insensitive to variations in operating parameters for a given set of design parameters. In one example, a 2 inch inlet line was connected to a 15 foot vertical separator having a 4 inch diameter, at a point 6 feet above the lower end of the separator. Clear piping was used so that gas behavior could be visually observed to ensure no gas was carried through to the liquid outlet. Gas ranges from 5% by volume to greater than 90% by volume were flowed through the system at rates up to 60 lb/min of air; with separations approaching 99% being observed throughout the entire range.

In an alternative and preferred embodiment, depicted in FIG. 3, a second stage vertical separator tube 200 is operably connected and in fluid communication with first stage separator tube 30 via single gas phase line 50. Gas line 50 is positioned at a similar decline angle as first stage inlet 10, and like inlet 10 is also mounted eccentrically to second stage separator 200 to promote further stratification of the gas from any liquid 210 entrained in the gas component. Further stratification is achieved through the same induced vortex means, generated by the combined cycline effect and gravity, as used in the first stage separator. The second stage gas is directed to the gas recovery portion 220 of the second stage separator and through second stage gas line 230. Recovered liquid 210 is collected in the lower portion of the second stage separator and combined with liquid recovered in the first stage separation via liquid phase line 60. The combined first and second stage liquids enter vertical collection column 240 through a tangential, inlet port 250, similar in configuration to first stage liquid exit port 70. The combined liquids enter inlet port 250 via liquid phase line 60, positioned perpendicular to collection column 240 in a similar configuration as found in exit port 70 of the first stage. The combined liquids collect in collection column 240, rising to a level above inlet port 250 to form a static head of liquid 260. Recovered gas, directed through gas line 230, which is in fluid communication with collection column 240, is used to regulate the fluid height of the hydrostatic head 260 by use of gas control valve 270. The maintenance of hydrostatic head 260 is essential in this embodiment to ensure that liquid pressure through coriolis flow meter 100 is maintained, thereby preventing gas from coming out of solution as a result of a pressure drop in the meter. Liquid flowing into meter 100 is the same as in the previous embodiment, wherein the combined liquid exits the collection column via a tangential exit port 280, similar to exit port 70 in the first stage.

The use by the present invention of partial phase separation through a downward slanting inlet lines and two stages of vortex separation, provides a high separation efficiency for both steady and unsteady fluid flows over the entire range of oil/water/gas volume fractions, as evidenced by performance graph shown in FIG. 4. According to the performance data indicated in FIG. 4, the preferred embodiment of present device is not limited to a specific gas to liquid range, but instead is only limited to a specific upper limit gas velocity range where annular flow is initiated. The present invention, by using tangentially positioned inlet and exit ports, and inlet lines having a downward inclination to create and enhance a generated liquid vortex, is therefore capable of providing efficient separation of all flow regimes up to the point where the gas velocity reaches the onset of annular flow.

As will be readily apparent, the invention must not be considered as limited to the examples described with reference to the accompanying drawings, but can be extended to many alternative forms of construction and adaptions within the capacity of those skilled in the art without departing from the scope in spirit of the invention.

What is claimed is:

1. An inline three-phase metering system for multiphase continuous fluid streams comprising:

(a) a means for stratifying the continuous fluid stream into substantially liquid and gas streams prior to entering a primary vertical-axis separation tube, said stratifying means coupled to the separation tube by an inlet nozzle having a specified dimension to control fluid velocity, said nozzle at a position eccentric to an inflow entry point of said tube at a declination angle to the horizontal axis of said tube for inducing a vortical flowing of the fluid stream to establish a gas/liquid interface of said fluid stream subjacent to said inflow entry;

(b) a gas flow passage having a gas flow measuring means interposed therein, said gas flow passage connected to a gas recovery region of the separation tube;

(c) a liquid flow passage having a liquid phase measuring means interposed therein, said liquid flow passage connected to the separation tube at a position eccentric and perpendicular to said tube in a liquid recovery region of said tube at a location subjacent to said inlet nozzle at a distance sufficient to allow gas bubbles within the liquid to separate from the liquid; and (d) a fluid discharge pipe operably connecting both the gas flow passage and liquid flow passage at a common fluid mixture point.

2. The separator as described in claim 1 in which the stratifying means is a length of pipe at a declination angle of approximately 27°.

3. The separator as described in claim 1 in which the liquid flow measuring means is a coriolis flow meter.

4. The three-phase metering system described in claim 1 further comprising:

(a) a second stage vertical-axis separation tube coupled to the gas flow passage of the primary separation tube at a position eccentric to an inflow entry point of said second stage tube at a declination angle to the horizontal axis of said second stage tube, said second stage separation tube having a gas recovery region superior to said inlet and a liquid recovery region subjacent to said inlet, wherein said liquid recovery region is in fluid communication with the liquid flow passage of the primary separator; and (b) a vertical collection column in fluid communication with the gas recovery region and liquid recovery region of the second stage separation tube, wherein the gas recovery region is operably connected to the gas flow measuring means and the liquid recovery region is in fluid communication with the coriolis based liquid phase measuring means.

5. A method for measuring phase components of a multiphase continuous fluid stream comprising:

(a) inducing an initial flow-splitting of the fluid stream by stratifying said stream into substantially a liquid and a gas stream by directing the liquid stream through an inlet nozzle and into a downwardly spiralling flow configuration within a separation column to generate a liquid vortical flow and establish a liquid column having a gas/liquid interface subjacent to said inlet to increase gas buoyancy and enhance separation of a remaining gas component of the liquid stream;

(b) diverting the liquid vortical flow without disrupting the flow and without a loss of flow energy by directing said flow to an eccentrically positioned liquid flow passage;

(c) diverting the gas stream and gas component recovered from the liquid stream into a gas flow passage;

(d) measuring the gas flow characteristics of the diverted gas and the liquid flow characteristics of the diverted liquid;

(e) recombining the diverted gas flow and diverted liquid flow into a common multiphase outflow stream.

6. The method as described in claim 5 in which the positioning of the inlet nozzle is determined based on an estimation of gas bubble trajectory.

7. The method as described in claim 5 in which the liquid flow characteristics are measured by a coriolis flow meter.

8. The method as described in claim 5 further comprising a diverting of the gas stream for a second stratification, wherein liquid recovered therefrom is recombined with the diverted liquid in the liquid flow passage.

9. The method as described in claim 5 in which the velocity of the liquid stream through the inlet has an upper limit to prevent churn flow.

* * * * *